No. 686,875. Patented Nov. 19, 1901.
O. M. WOLFF.
PITTING MACHINE.
(Application filed Nov. 30, 1900.)
(No Model.) 2 Sheets—Sheet 2.
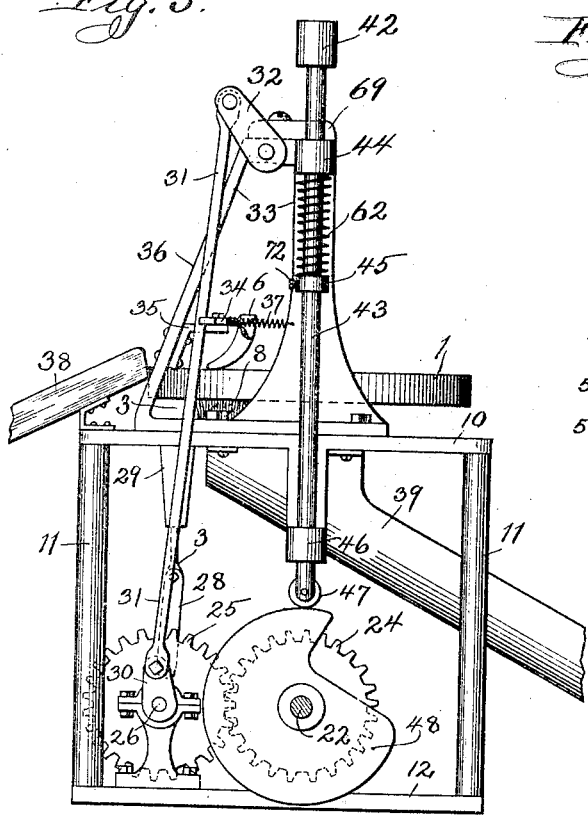
Fig. 3.
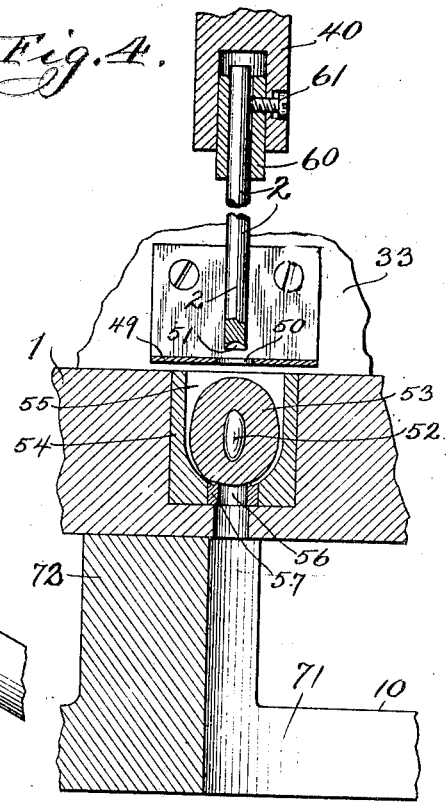
Fig. 4.
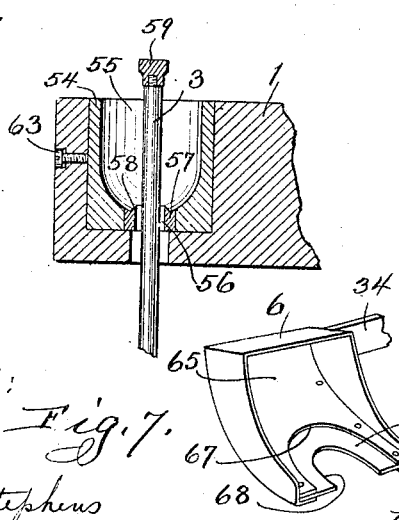
Fig. 5.
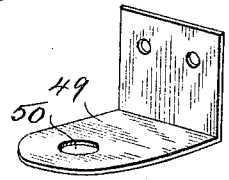
Fig. 6.
Fig. 7.
Witnesses:
R. J. Jacker
Glen C. Stephens
Inventor:
Oscar M. Wolff
By W. R. Rummler
his Atty.

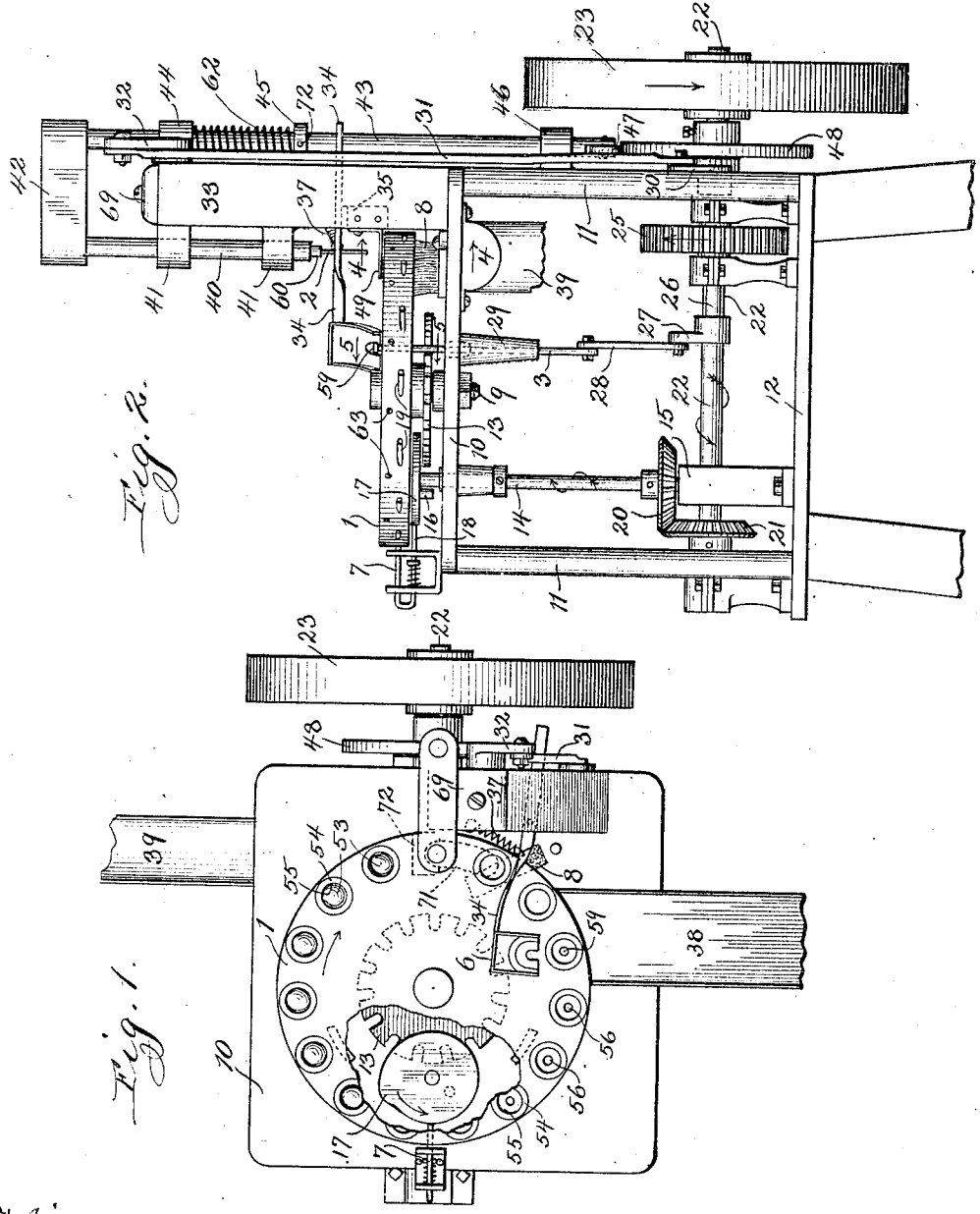

UNITED STATES PATENT OFFICE.

OSCAR M. WOLFF, OF CHICAGO, ILLINOIS.

PITTING-MACHINE.

SPECIFICATION forming part of Letters Patent No. 686,875, dated November 19, 1901.

Application filed November 30, 1900. Serial No. 38,171. (No model.)

*To all whom it may concern:*

Be it known that I, OSCAR M. WOLFF, a citizen of the United States of America, and a resident of Chicago, in the county of Cook and State of Illinois, have invented certain new and useful Improvements in Pitting-Machines, of which the following is a specification.

My invention relates to machines for removing the pits or stones from fruit. The machine hereinafter described is designed particularly for removing the pits from olives preparatory to filling the olives with some other edible material.

The main objects of my present invention are to provide improved mechanism for operating the pitting-plunger, to provide improved means for removing the fruit from the carrier after same has been pitted, to provide a positive stop for the fruit-carrier during the operation of pitting, and to detach from the carrier any pits that may adhere to same after their removal from the fruit, and thus prevent such pits from clogging or interfering with the operation of other parts of the machinery.

The further objects of the different parts with which I put my invention into practice will be understood from the following description with reference to the accompanying drawings, in which—

Figure 1 is a top plan of a pitting-machine constructed according to my invention. Fig. 2 is a side elevation of same. Fig. 3 is a rear elevation omitting the drive-pulley shown in Figs. 1 and 2. Fig. 4 is an enlarged section on the line 4 4 of Fig. 2. Fig. 5 is an enlarged section on the line 5 5 of Fig. 2. Fig. 6 is a perspective view of the plate used in connection with the pitting-plunger for preventing the fruit from being raised by said plunger out of the pockets in the carrier. Fig. 7 is a perspective view, partly broken away, of the deflector used in throwing the fruit from the carrier.

The machine shown consists, mainly, of a supporting-frame having thereon a horizontally-disposed rotary platform or carrier 1, which serves as a fruit-carrier; a pitting-plunger 2, which drives the pit through the bottom of pockets in said carrier; a discharge-plunger 3, which lifts the fruit out of its pocket after the pit has been removed; a deflector 6, which throws the fruit from the top of the carrier after same has been lifted by the discharge-plunger; a stop 7, which holds the carrier against any shifting movement while the plungers are in the pockets of the carrier; a guard or brush 8, acting against the bottom of the carrier and designed to detach from the carrier any pits which may adhere to same after their removal from the fruit, and the mechanism for operating said parts, which are hereinafter more fully described.

The platform or carrier 1 is rigid on the shaft 9, which is journaled on the plate 10 of the frame. Said plate is supported by the uprights 11 on the base 12. A gear-wheel 13 is rigid on the shaft 9. The shaft 14 is journaled in the plate 10 and in the bearing-piece 15 on the frame. The lug or tooth 16 is rigid on the shaft 14 and meshes with the gear-wheel 13 at each revolution of the shaft 14. The cam-wheel 17 is also rigid on said shaft 14 and bears against the arm 18 of the stop 7. The cam-wheel 18 is so arranged that at each revolution while the tooth 16 is in engagement with the gear-wheel 13 the arm 18 will be forced outwardly, so as to release the stop 7 from the recess 19 in the carrier 1. The bevel-gear 20 is rigid on the shaft 14 and meshes with the bevel-gear 21, which is rigid on the driving-shaft 22. The drive-pulley 23 and gear-wheel 24 are also rigid on said shaft 22. The gear-wheel 24 meshes with a gear-wheel 25, which is rigid on the shaft 26. The crank 27 is rigid on the shaft 26 and pivotally connected to the discharge-plunger 3 by means of the arm 28. The plunger 3 is vertically slidable in the sleeve 29, which is secured to the plate 10. The crank 30 is rigid on the shaft 26 and is pivoted to the arm 31, which is pivoted at its upper end to the link 32. Said link is pivoted to the standard 33 of the frame. The deflector 6 is secured to the arm 34, which is pivoted to the bracket 35 of the frame. Said bracket is secured to the brace 36. The spring 37 is secured at one end to the arm 34 and at the other end to the standard 33. Said spring holds the deflector 6 inwardly against the action of the rod 31. The swing of the rod 31 through the action of the crank 30 will cause the oscillation of the deflector 6. A trough 38 is secured to the plate 10 at the side of the carrier 1 and near the deflector 6 and is designed to receive the fruit when thrown from said deflector. The trough 39 is secured under the plate 10 and below the plunger 2. The plate 10 has an aperture 71 therein, permitting the pits to drop through the carrier into the trough 39. The plunger 2 is rigidly secured to the arm 40, which is vertically slidable in the brackets 41, secured to the standard 33. A weight 42 is rigidly secured to the arm 40 and to the arm 43, which is likewise vertically slidable in the bracket 44 on the standard 33 and in the bracket 46, which is supported by the plate 10. The collar 45 is rigid on the arm 43. A roller 47 is journaled in the lower end of the arm 43. Said roller bears upon the periphery of the cam-wheel 48, which is rigid on the shaft 22. The plate 49 is rigidly secured to the standard 33 and has an aperture 50 therein for receiving the plunger 2. The plunger 2 is preferably made of hardened steel and has a concave surface 51 in its free end, as shown in Fig. 4. This formation of the free end of the plunger insures a proper contact of the plunger with the pit 52 of the olive 53. (Shown in Fig. 4.)

The carrier 1 has a series of apertures therein for receiving the bushings 54, having therein the pockets 55. Each of said pockets has a contracted aperture 56 through its bottom. Each of said apertures is preferably surrounded by a rim 57 of hardened steel, which is rigidly secured in its bushing 54. Each rim 57 has a cutting edge 58 projecting upwardly into the pocket. This cutting edge 58 aids in steadying the olive during the action of the pitting-plunger 2 and aids in making a clean cut through the olive. The discharge-plunger 3 is preferably provided with a head 59, threaded to the upper end of said plunger. The head 59 may be removed and replaced by a larger head, to be used in case bushings 54 with larger apertures are employed, as for handling larger fruit. The bushings 54 are made in complete sets, having pockets 55 and apertures 56 of different sizes. Said bushings are readily removed from the carrier by loosening the set-screws 63. The brush 8 is secured to the plate 10 between the plungers 2 and 3 and prevents any pits from being carried to the plunger 3. The plunger 2 is supported in a sleeve 60. Said sleeve has a perforation therein for receiving the set-screw 61. The sleeve 60 rests in the hollow end of the arm 40. The set-screw 61 is seated in the arm 40 and bears against a flattened part of the plunger 2. The spring 62 is seated between the collar 45 and the bracket 44 and aids the weight 42 in imparting a rapid downward movement to the plunger 2. The deflector 6 is preferably made in the form of a scoop. The body of same is made of metal. A leather sheet 64 is held between the plates 65 and 66, which form the bottom of the scoop. Said plates are cut away at 67. The leather sheet has a recess 68 therein which prevents contact of the scoop with the head 59 of the discharge-plunger 3. The object of the leather sheet 64 is to avoid injury to the fruit when the deflector is brought in contact with same. 69 is a rubber pad which cushions the fall of the weight 42 upon the standard 33. The collar 45 may be adjusted by means of the set-screw 72 to regulate the tension of the spring 62. The support 72 is rigid on the plate 10 and steadies the platform 1 near the plunger 2.

The operation of my device is as follows: The operator will preferably stand at the front of the machine, which is at the left of Figs. 1 and 2. The fruit will here be fed into the pockets 55. The carrier 1 will be intermittently revolved toward the left, carrying the fruit toward the plunger 2. At the end of each interval of movement of the carrier 1 the same will be firmly held by the stop 7 acting in one of the depressions 19. While the carrier is so held the cam-wheel 48 is in proper position to permit the arm 43 to drop into the depression in said cam-wheel. This will carry the plunger 2 downwardly, causing same to cut through the fruit and to force the pit through the aperture in the bottom of the pocket. The pit will drop into the trough 39. The cam-wheel 48 will then gradually raise the plunger 2 out of the pocket. The apertured plate 49 will prevent the fruit from being raised with the plunger 2. After the plunger 2 has left the pocket the cam-wheel 17 will force the stop 7 out of the aperture 19, and the tooth 16 will engage with the gear-wheel 13 and again move the carrier 1, so as to advance the next pocket to the plunger 2. While the plunger 2 is descending the discharge-plunger 3 will ascend through one of the pockets which has been advanced from the plunger 2. The fruit remaining in such advanced pocket will be raised by the plunger 3 and will then be thrown into the trough 38 by the action of the deflector 6. The plunger 3 will then withdraw before the next movement of the carrier 1.

It will be understood that many of the details of the machine shown may be altered without departing from the spirit of my invention. I therefore do not confine myself to such details, except as hereinafter limited in the claims.

What I claim as my invention, and desire to secure by Letters Patent, is—

1. In a fruit-pitting machine the combination of a supporting-frame; a horizontally-disposed rotary platform thereon having pockets for receiving the fruit; said pockets having each a contracted aperture in its bottom; a pitting-plunger adapted to drive the pit through the fruit and the bottom of its pocket; a discharge-plunger adapted to raise the fruit from its pocket after the pit has been removed from the fruit; a deflector movable on said frame relatively to said platform and adapted through such movement to deflect the fruit from the direction of movement of said discharge-plunger; mechanism operating the plungers and deflector, and moving said platform while the plungers are withdrawn from the pockets; and a stop coacting with said mechanism for rigidly holding said platform in fixed position while either plunger is in any of said pockets.

2. In a fruit-pitting machine the combination of a supporting-frame; a horizontally-disposed rotary platform thereon having pockets for receiving the fruit; said pockets having each a contracted aperture in its bottom; a pitting-plunger adapted to drive the pit through the fruit and the bottom of its pocket; means for keeping the fruit in its pocket after the withdrawal of the pitting-plunger; a discharge-plunger adapted to raise the fruit from its pocket after said pocket has been advanced from the pitting-plunger; a deflector movable on said frame above the discharge-plunger, and adapted through such movement to deflect the fruit from the direction of movement of the discharge-plunger; mechanism operating the plungers and deflector and moving the platform while the plungers are withdrawn from the pockets; and a stop coacting with said mechanism for rigidly holding said platform in fixed position while either plunger is in any of said pockets.

3. In a fruit-pitting machine the combination of a supporting-frame; a horizontally-disposed rotary platform thereon having pockets for receiving the fruit; said pockets having each a contracted aperture in its bottom; a pitting-plunger adapted to drive the pit through the fruit and the bottom of its pocket; means for keeping the fruit in its pocket after the withdrawal of the pitting-plunger; a discharge-plunger adapted to raise the fruit from its pocket after said pocket has been advanced from the pitting-plunger; a deflector movable on said frame above the discharge-plunger, and adapted through such movement to deflect the fruit from the direction of movement of the discharge-plunger; mechanism operating the plunger and deflector and moving the platform while the plungers are withdrawn from the pockets; and a guard under said platform and between said plungers adapted to disengage any pits adhering to the platform after their removal from the fruit.

4. The combination of a supporting-frame; a traveling platform thereon having pockets for receiving the fruit; said pockets having each a contracted aperture in its bottom; a reciprocating plunger adapted to drive the pit through the fruit and bottom of its pocket; means for keeping the fruit in its pocket after the withdrawal of the plunger; means for discharging the fruit from its pocket after the pocket has been advanced from the plunger; a receptacle for the fruit near such advanced pocket; and a movable member acting across the mouth of such advanced pocket and adapted to throw the fruit into said receptacle.

5. In a machine of the class described, the combination of a fruit-carrier having pockets therein for receiving the fruit; said pockets having each a contracted aperture in its bottom; a discharge-plunger acting through said aperture and adapted to move the fruit out of its pocket; a deflector movable across the mouth of said pocket, and adapted to catch the fruit when removed by said plunger; and mechanism for operating said plunger and deflector.

6. In a fruit-pitting machine, a deflector having a body of metal or other suitable stiff material with a recess formed in the edge and a flexible sheet secured in said recess for the purpose specified.

Signed at Chicago this 21st day of November, 1900.

OSCAR M. WOLFF.

Witnesses:
 WM. R. RUMMLER,
 GLEN C. STEPHENS.